United States Patent [19]

Schwefel

[11] Patent Number: 4,521,845
[45] Date of Patent: Jun. 4, 1985

[54] NUMERICAL CONTROL DEVICE

[75] Inventor: Ernst Schwefel, Traunreut, Fed. Rep. of Germany

[73] Assignee: Dr. Johannes Heidenhain GmbH, Traunreut, Fed. Rep. of Germany

[21] Appl. No.: 275,747

[22] Filed: Jun. 22, 1981

Related U.S. Application Data

[63] Continuation of Ser. No. 39,146, May 15, 1979, abandoned.

[30] Foreign Application Priority Data

May 19, 1978 [DE] Fed. Rep. of Germany ....... 2821843

[51] Int. Cl.³ ............................................. G06F 15/46
[52] U.S. Cl. .................................. 364/171; 364/192; 318/568; 318/591
[58] Field of Search ............... 364/513, 474, 171, 190, 364/191–193; 318/568, 590, 569, 591

[56] References Cited

U.S. PATENT DOCUMENTS

| | | | |
|---|---|---|---|
| 3,634,662 | 1/1972 | Slawson | 318/601 |
| 3,689,892 | 9/1972 | Glenn et al. | 364/513 |
| 3,920,972 | 11/1975 | Corwin, Jr. et al. | 364/193 |
| 4,021,651 | 5/1977 | Mitsuhashi et al. | 364/513 |
| 4,025,838 | 5/1977 | Watanabe | 364/513 |
| 4,074,349 | 2/1978 | Ueda | 364/474 |
| 4,104,976 | 8/1978 | Landau, Jr. et al. | 364/191 |
| 4,115,859 | 9/1978 | Brisk et al. | 364/476 |
| 4,135,239 | 1/1979 | Hamill et al. | 364/171 |
| 4,136,390 | 1/1979 | Farrell et al. | 364/474 |
| 4,139,888 | 2/1979 | Salmon | 364/188 |
| 4,141,065 | 2/1979 | Sumi et al. | 364/186 |
| 4,150,427 | 4/1979 | Slawson | 364/192 |
| 4,177,317 | 9/1978 | Dooley, Jr. et al. | 428/405 |
| 4,199,814 | 4/1980 | Rapp et al. | 364/171 |

FOREIGN PATENT DOCUMENTS 1928996 12/1970 Fed. Rep. of Germany .

OTHER PUBLICATIONS

Deutche Normen DIN 66 025, Blatt 1 & 2, West Germany.
ISO Recommendation R 1056, R 1058, 4-69.
Ela Standard RS-273-A, 5-67.
Heidenhain TNC, 121 Positioner and Linear Path Control, 208 049 21.2009/78E.
Heidenhain TNC, 121 Position-und Streckensteuerung, 208 041 12.50.2/79E.

Primary Examiner—Gary Chin
Attorney, Agent, or Firm—Hume, Clement, Brinks, Willian & Olds

[57] ABSTRACT

A control device for a numerically controlled machine tool includes both on/off and continuously variable switches which are coupled via a computer to associated machine functions such as coolant flow or feed rate. The computer is programmed to operate in any one of three modes. In the first mode the manually controlled input switches are read by the computer during computer-controlled processing of a first workpiece according to processing information stored in memory, the computer stores information regarding the state of the switches for later use, and also controls the machine functions to correspond with the current state of the input switches. In the second mode the computer controls the machine functions during computer-controlled processing of subsequent workpieces in accordance with previously stored information, independently of the current position of the input switches. In the third mode, the computer controls the associated machine functions during computer-controlled processing of a workpiece in accordance with the current state of the input switches, without storing this information. In use, this control device allows an operator to program associated machine tool functions at the selected times in the computer-controlled processing of a workpiece by operating the same switches which are customarily used to select additional machine functions, and thereby eliminate arbitrary programming codes and procedures that require programming skills.

20 Claims, 2 Drawing Figures

NUMERICAL CONTROL DEVICE

CROSS-REFERENCE TO RELATED APPLICATIONS

This application is a continuation of pending U.S. patent application Ser. No. 39,146, filed May 15, 1979, now abandoned.

BACKGROUND OF THE INVENTION

The present invention relates to a numerical control device for processing machines, such as machine tools, for example, which control device includes a computer, a memory unit and an input unit for programming machine functions.

In conventional numerically controlled machine tools it is common practice according to Deutche Normen DIN 66025 to code additional machine functions, such as "Coolant on/off", or "Spindle Turning Direction left/right" by means of the address letter M and a two-digit number. Feed rates are generally coded by means of the address letter F followed by a two-digit number. Frequently, feed rates are encoded as the address letter F and the feed rate in millimeters per minute. When such control codes are used the operator may often be called on to retain a very large number of code symbols in his memory, which may lead to operational errors.

In West German unexamined patent specification OS. No. 1,928,996 a numerical control for machine tools is described in which such operating information is entered by means of coded keys of a hand input device which simultaneously stores the selected code on punched strips. After the processing of a first workpiece, the punched strip is then fed into a reading or control apparatus in order to control the machine tool and produce further workpieces of the same type. In this device the operator must have programming experience in order to properly use the input device.

SUMMARY OF THE INVENTION

The present invention is directed to an improved input device for a numerically controlled processing machine that does not burden the operator with numerical codes in the input of additional machine functions.

According to this invention an input unit is provided which includes a plurality of manually controlled digital and analog inputs such as switching elements and adjusting elements. The input unit also has a plurality of outputs which are connected to control various machine functions. A computer such as a microprocessor and associated memory is coupled to the input unit such that the computer can read data placed on the inputs and can control the various machine functions by placing data on appropriate outputs. This input unit is provided with at least two modes of operation. In the first mode (a program entry mode which is generally used in processing the first workpiece of a series) the digital and analog inputs act to control the associated machine functions. Simultaneously, the computer stores the states of these inputs in computer memory. In the second mode (a program run mode which is generally used in processing further similar workpieces) the computer controls the associated machine functions in accordance with the stored data in computer memory, independently of the state of the input switching elements and adjusting elements.

One important advantage of the numerical control of this invention is that in the processing of a first workpiece the operator can switch in additional, auxiliary, machine functions such as, for example, "Coolant on/off" or "Spindle Turning Direction left/right" at the appropriate time in the processing by means of switching elements and adjusting elements which must be present in any case on the machine tool, and can easily be mounted on the input unit. The operator is not required to know or remember the specific codings for the individual additional functions, so that the machine tool can be readily operated by an operator who lacks programming experience. The computer automatically stores the positions of the switching and adjusting elements in computer memory so that in later runs additional machine functions are activated at the appropriate processing times by the computer which uses the stored input information instead of the positions of the switching and adjusting elements. At any time, however, despite the stored program for the additional functions it is possible to revert to manual operation of the switching and adjusting elements, so that both automatic and manual control of the additional functions is available at will.

The invention, together with further objects and attendant advantages, will be best understood by reference to the following detailed description taken in connection with the appended drawings.

DETAILED DESCRIPTION OF A PREFERRED EMBODIMENT

Figure 1:
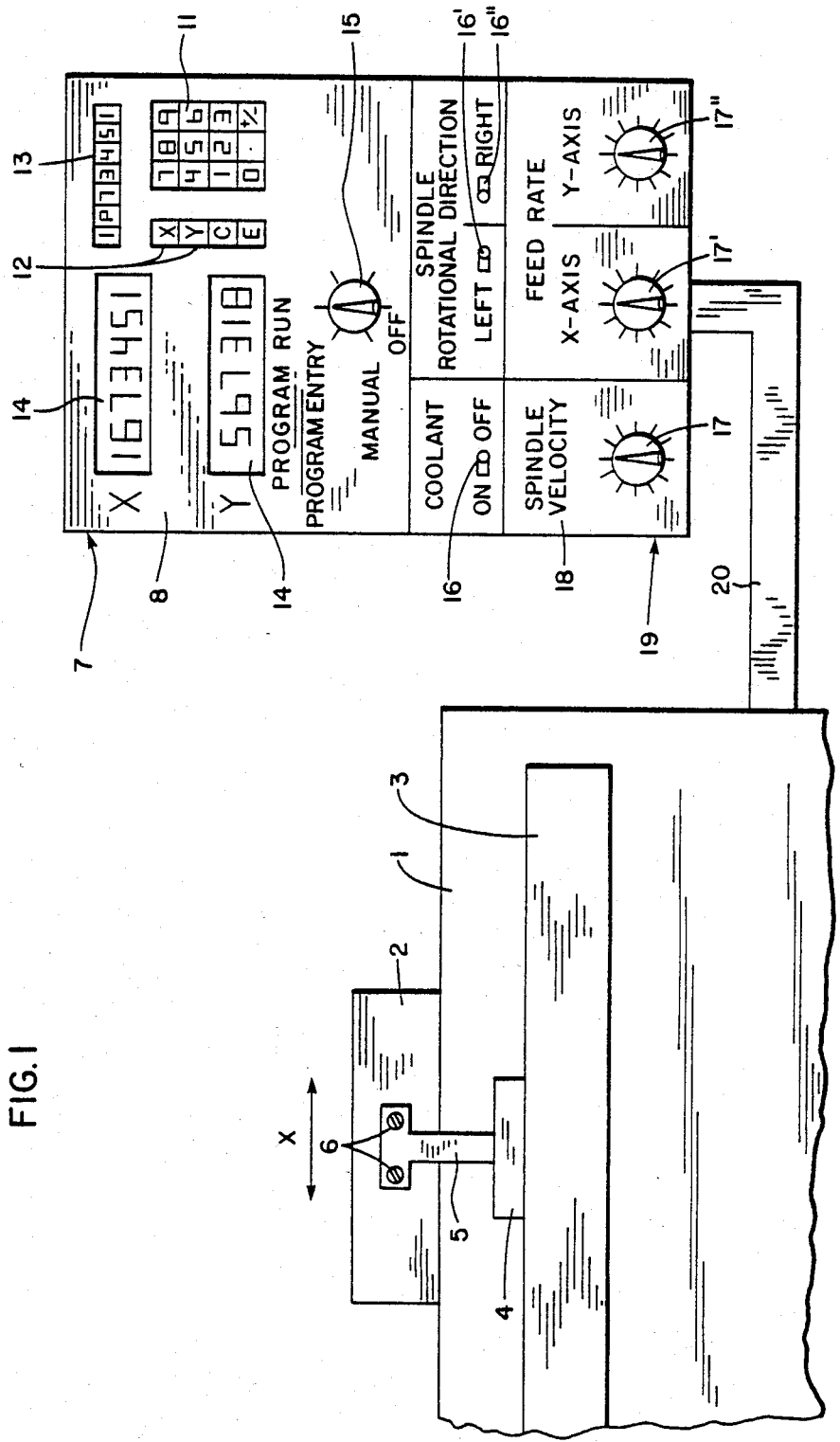
FIG. 1 shows a portion of a processing machine including a preferred embodiment of the input unit of the invention.

Turning now to the drawings, FIG. 1 shows a processing machine such as a machine tool including a bed 1 and a slide piece 2 movable relative to the bed 1 in the direction shown by the arrow (the X axis). The relative movements of the slide piece 2 with respect to the bed 1 are measured by a length measuring device in which a scale (not shown) mounted on a scale carrier 3 is scanned by a scanning unit 4 in a known manner. The scanning unit 4 is connected to the slide piece 2 by means of an entrainment member 5 which is secured to the slide piece 2 by means of a screw connection 6.

For numerical control of the processing machine there is provided a numerical control apparatus 7, such as is described, for example, in the prospectus entitled "Heidenhain, Position and Linear Path Control (TNC 121, 67 d 5 4/78 1 E)." This control apparatus 7 includes a manual data input panel 8 for the input of path information for the X and Y axes, a memory unit 9 (FIG. 2) for storing this path information, and a computer 10 (FIG. 2) for calculating the sum or difference of one or more path information inputs. Path information is input by means of an input keyboard 11 and axis selector keys 12. A display 13 for the input values is also provided on the hand data input panel 8, along with an actual or measured value display 14 for the X and Y axes and a mode control switch 15 having the switching positions "Manual", "Program Entry", "Program Run" and "Off".

Several additional machine functions, such as, for example, "Coolant on/off", "Spindle turning direction left/right", and "Feed Rate for the X and Y Axes" are specified by means of conventional switching elements 16,16',16" in the form of on/off switches and adjusting elements 17,17',17" in the form of potentiometers. These switching and adjusting elements are mounted on a switchboard 18 of an input unit 19, which together with the numerical control apparatus 7 is secured by means of a swingable arm 20 to the bed 1 of the processing machine.

Figure 2:
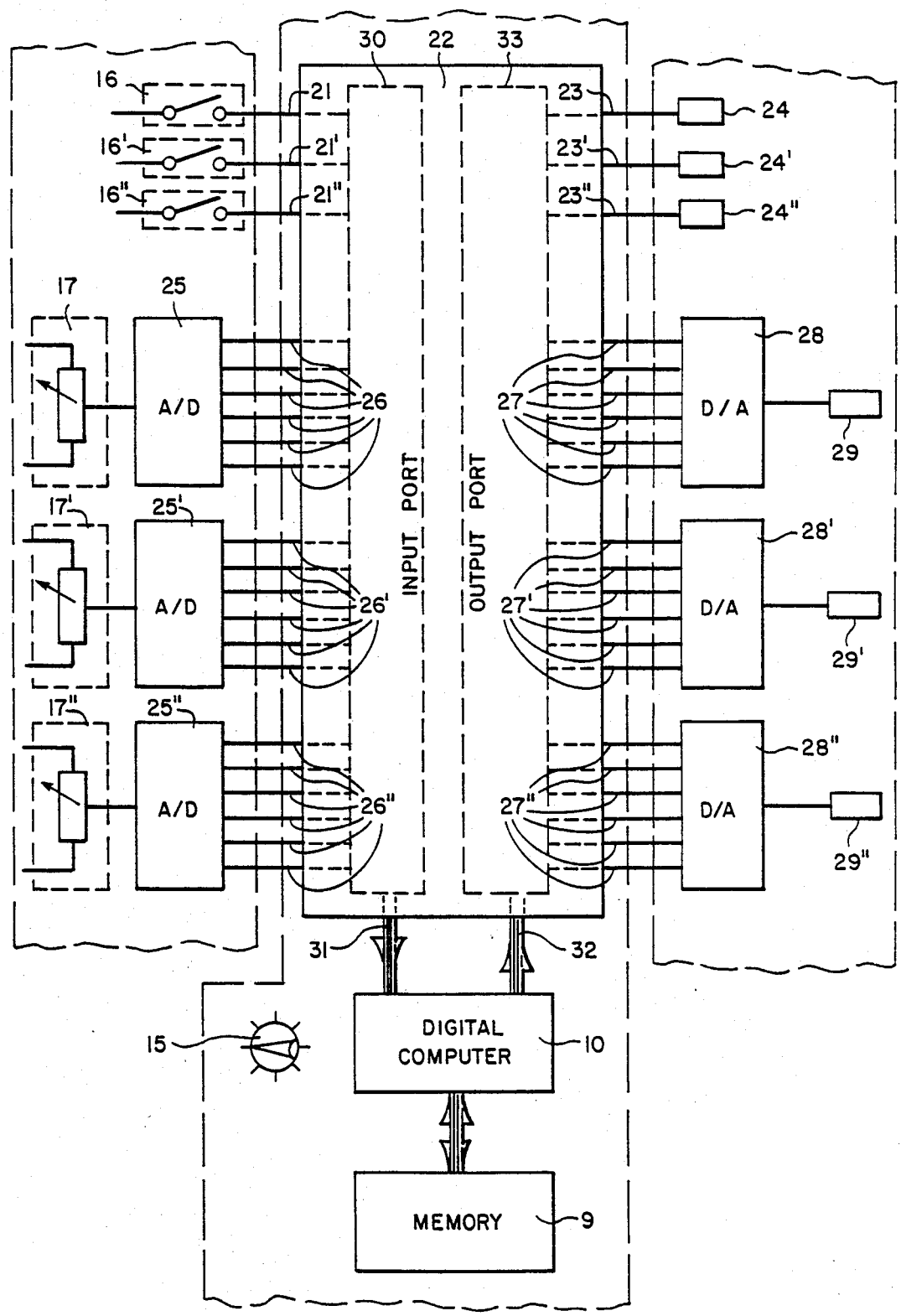
FIG. 2 shows a block diagram of the electrical circuit for the input unit of FIG. 1.

As shown in FIG. 2, the switching elements 16,16',16" are on/off switches which are connected to the inputs 21,21',21", respectively, of an input/output (I/O) unit 22, the corresponding outputs 22,23',23" of this I/O unit 22 are connected to corresponding operating elements 24,24',24" for the appropriate machine functions. The adjusting elements 17,17',17" are potentiometers which are connected by means of analog-to-digital converters 25,25',25" to inputs 26,26',26", respectively, of the I/O unit 22. Corresponding outputs 27,27',27" of this I/O unit 22 are connected by means of digital-to-analog converters 28,28'28" to corresponding operating elements 29,29',29" for the appropriate machine functions.

The inputs 21,21',21", 26,26',26" of the I/O unit 22 are connected by means of an input port 30 and an input bus 31 with the computer 10, which is in turn coupled to computer memory 9. The computer 10 is also connected by means of an output bus 32 and an output port 33 with the corresponding outputs 23,23',23", 27,27',27". As described in connection with FIG. 1, switching element 16' designates "Coolant on/off", switching element 16' designates "Spindle turning direction left", switching element 16" designates "Spindle turning direction right", adjusting element 17 designates "Spindle rotational rate", adjusting element 17' designates "Feed rate for the X-axis", and adjusting element 17" designates "Feed rate for the Y-axis".

For processing a first workpiece, the operator enters the path information by means of the hand data input panel 8 of the numerical control apparatus 7 into the memory 9, possibly with sum or difference formation by the computer 10. During the execution of this positioning program (mode switch 15 positioned to "Program Entry") the operator manually switches any additional machine functions required at the respective processing time by means of the switching elements 16,16',16" and the adjusting elements 17,17',17". These switching and adjusting elements act upon the appropriate operating elements 24,24',24", 29,29',29" and the states of these switching and adjusting elements are simultaneously stored in the memory unit 9. After the first workpiece has been processed, additional workpieces may be automatically processed (mode switch 15 positioned to "Program Run") and the operating elements 24,24',24", 29,29', 29" are actuated at the corresponding points in the processing by means of the computer 10 which uses the stored input information independently of the current positions of the switching elements 16,16',16" and adjusting elements 17,17',17". At any time, however, despite the stored program for the additional functions, it is possible to revert from automatic operation back to manual operation by positioning the mode switch 15 in switching position "Manual", whereupon the operating elements 24,24',24", 29,29',29" are controlled exclusively by the positions of the switching elements 16,16',16" and adjusting elements 17,17',17".

The analog-to-digital converters 25,25',25" and digital-to-analog converters 28,28',28" needed for the adjusting elements 17,17',17" preferably are characterized by a nonlinear characteristic curve, in order that maximum dynamic range may be obtained with as few bits as possible (in the preferred embodiment with six bits). In this way the selectable range of spindle turning rate and feed rate may be maximized. When linear analog-to-digital converters 25,25',25" and digital-to-analog converters 28,28',28" are used, a nonlinear characteristic curve can be generated, in a manner not represented, by interposing correspondingly programmed Programmable Read Only Memories.

One important advantage of this invention is that the operator of this numerically controlled processing machine does not have to have any kind of experience in programming in order to be able to input additional machine functions. Furthermore, either automatic or manual control of the additional machine functions can be easily and simply selected.

In other embodiments of the invention the adjusting elements 17,17',17" can be construed as step switches and the input port 30 and the output port 33 each incorporate at least one microprocessor. In addition, feed rates for the X and Y axes can be adjusted in a manner not shown by means of a single adjusting element in conjunction with the axis preselection keys 12 for the X and Y axes.

Of course, it should be understood that various changes and modifications to the preferred embodiment described herein will be apparent to those skilled in the art. For example, the invention can be used with other processing machines which have a greater or lesser number of controllable axes. Such changes and modifications can be made without departing from the spirit and scope of the present invention, and without diminishing its attendant advantages. It is, therefore, intended that such changes and modifications be covered by the following claims.

I claim:

1. A control apparatus for a processing machine including a plurality of means for executing additional machine functions, said apparatus comprising:
   computer means including memory means;
   a plurality of manually controlled input devices selectively operable during computer-controlled processing of a workpiece for generating at selected times during the computer-controlled processing of a workpiece control signals for the plurality of executing means;
   interfacing means interposed between the input devices and the executing means and coupled to the computer means for enabling the computer means to read the state of the plurality of input devices and to selectively activate and deactivate the plurality of executing means;
   means for manually selecting a first mode of operation of the computer means in which the computer means continuously controls the processing of a first workpiece according to processing information stored in the memory means and wherein the computer means during the continuous computer-controlled processing of the first workpiece reads and stores the state of the plurality of input devices and the executing means are activated and deactivated during the computer-controlled processing of the first workpiece to correspond to the current state of the plurality of input devices; and
   means for manually selecting a second mode of operation of the computer means in which the computer means during the computer-controlled processing of a subsequent workpiece activates and deactivates the executing means in accordance with the previously stored state of the plurality of input devices, independently of the current state of the plurality of input devices.

2. The apparatus of claim 1 further including means for manually selecting a third mode operation of the computer means in which the plurality of executing means are activated during the computer-controlled processing of a workpiece in response to the current state of the plurality of input devices without altering the stored state of the plurality of input devices.

3. The apparatus of claim 1 wherein the interfacing means includes an input port coupled to the computer means by an input bus and an output port coupled to the computer means by an output bus.

4. The apparatus of claim 1 or 2 or 3 wherein a portion of the input devices generate analog signals, and the interfacing means includes at least one analog-to-digital converter means for digitizing said analog signals for input to the computer means and at least one digital-to-analog converter for providing analog output signals to the portion of the plurality of executing means corresponding to the portion of input devices generating analog signals.

5. The apparatus of claim 4 wherein both the analog-to-digital converter and the digital-to-analog converter exhibit nonlinear conversion characteristics.

6. The apparatus of claim 1 wherein the input devices include at least one step switch.

7. In a control apparatus for a processing machine having means for executing a plurality of machine functions, said plurality of machine functions including a plurality of miscellaneous machine functions; said control apparatus including a computer means, a memory means included in the computer means, a plurality of input elements for generating a plurality of operation control signals, and switching means comprising input interfacing means for interfacing the plurality of control signals with the computer means and output interfacing means for interfacing the computer means with the executing means to control said plurality of machine functions; the improvement comprising:
 a plurality of manually controlled input elements, included in the plurality of input elements, selectively operable during computer-controlled processing of a workpiece for generating at the selected time during the computer-controlled processing of a workpiece the portion of the plurality of control signals associated with the miscellaneous machine functions;
 first means, included in the computer means and the switching means and operative during continuous computer-controlled processing of a first workpiece according to processing information stored in the memory means, for reading and storing in the memory means the states of the plurality of manually controlled input elements and for supplying a plurality of output signals to the executing means during continuous computer-controlled processing of the first workpiece to activate and deactivate the selected miscellaneous machine functions in accordance with the instantaneous states of the plurality of manually controlled input elements; and
 second means, included in the computer means and the switching means and operative during computer-controlled processing of additional workpieces subsequent to the processing of the first workpiece, for generating said plurality of output signals to selectively activate and deactivate selected miscellaneous functions in accordance with the previously stored states of the plurality of input elements, and independently of the current states of the plurality of input elements.

8. The invention of claim 7 further including manually controlled means for selectively enabling one of the first and second means.

9. The invention of claim 7 further comprising:
 third means, included in the computer means and the switching means, for generating, during computer-controlled processing of a workpiece, the plurality of output signals in accordance with the instantaneous states of the plurality of manually controlled input elements without altering the states of the plurality of input elements stored in the memory device, to provide manual control of the plurality of miscellaneous machine functions while preserving the states stored in the memory device; and
 manually controlled means for selectively enabling one of the first, second and third means.

10. The invention of claim 7 wherein the input and output interfacing means comprise an input port coupled to the computer means by an input bus and an output port coupled to the computer means by an output bus, respectively.

11. The invention of claim 7 or 8 or 9 wherein at least one of the manually controlled input elements generate analog control signals and the invention further comprises:
 at least one analog-to-digital converter, included in the input interfacing means, for digitizing said analog control signals for input to the computer means; and
 at least one digital-to-analog converter, included in the output interfacing means, for receiving digital signals provided by the computer means and providing analog signals to the executing means corresponding to the at least one of the manually controlled input elements.

12. The invention of claim 11 wherein both the analog-to-digital converter and the digital-to-analog converter exhibit non-linear conversion characteristics.

13. The invention of claim 7 wherein the plurality of manually controlled input elements includes at least one analog adjusting element.

14. The invention of claim 7 wherein the plurality of manually controlled input elements includes at least one on/off switch.

15. The invention of claim 7 wherein the plurality of manually controlled input elements includes at least one step switch.

16. In a numerical control apparatus for a processing machine having means for executing a plurality of functions, the control apparatus including computer means, memory means associated with the computer means, a pluality of input elements for generating signals representing processing information and a plurality of auxiliary functions, and input and output interfacing means for connecting the computer means with the input elements and the executing means, the improvement comprising:
 manually controlled input elements, included in the plurality of input elements, selectively operable for generating at the selected time during the computer-controlled processing of a workpiece a plurality of signals representing the plurality of auxiliary functions;

first means, included in the computer means and the interfacing means, for causing the computer means to control processing of a first workpiece according to processing information stored in the memory means, for causing the respective auxiliary functions to be performed during in the computer-controlled processing of the first workpiece based on the current state of the plurality of input elements, and for causing the computer means to store in the memory means during continuous processing of the first workpiece the plurality of signals representing the plurality of auxiliary functions; and second means, included in the computer means and the interfacing means, for causing the computer means to control the executing means during processing of subsequent workpieces according to the processing information and the plurality of auxiliary function signals stored in the memory means and independently of the signals currently generated by the manually controlled input elements.

17. The invention of claim 16 further including manually controlled means for selectively enabling one of the first and second means.

18. The apparatus of claim 16 further comprising:

third means, included in the computer means and the interfacing means, for causing the computer means to control the executing means during processing of a subsequent workpiece according to the processing information stored in the memory means and according to the current plurality of auxiliary control signals being generated by the manually controlled input elements and independently of the plurality of auxiliary function signals stored in the memory means without changing the plurality of auxiliary function signals stored in the memory means.

19. The invention of claim 18 further including manually controlled means for selectively enabling one of the first, second, and third means.

20. In a numerical control apparatus for a processing machine having means for executing a plurality of machine functions, said plurality of machine functions including a plurality of miscellaneous machine functions, the invention comprising:

a digital computer including a memory device and means for generating a plurality of digital output signals;

a plurality of manually operated control switches, said control switches including at least one multi-position digital switch operative to produce at least one digital control signal and at least one analog switch operative to produce at least one analog control signal, each control switch associated with one of the plurality of miscellaneous machine functions such that said control switches are operable independent of programming codes, said plurality of manually operated control switches selectively operable during computer-controlled processing of a workpiece for generating at the selected time the associated miscellaneous machine functions;

input and output interfacing means, included in the computer, for interfacing the control switches with the computer and for interfacing the computer with the executing means such that the executing means is responsive to the plurality of output signals to selectively activate and deactivate the plurality of machine functions, said input and output interfacing means including analog-to-digital converter means for digitizing the at least one analog control signal;

first means, included in the computer, for reading the instantaneous state of the control switches during continuous computer-controlled processing of a first workpiece according to processing information stored in the memory device, for storing said states in the memory device during continuous computer-controlled processing of the first workpiece, and for setting said output signals to activate and deactivate the miscellaneous machine functions to correspond to the instantaneous states of the control switches during processing of the first workpiece;

second means, included in the computer, for setting said output signals during computer-controlled processing of additional workpieces, subsequent to processing of the first workpiece, in accordance with previously stored states of the control switches and independent of the instantaneous states of the control switches, such that the miscellaneous machine functions are automatically controlled in the processing of the additional workpieces to duplicate the processing of the first workpiece;

third means, included in the computer, for setting said output signals to correspond to the instantaneous states of the control switches without modifying the control switch state information stored in the memory device such that the miscellaneous machine functions can be manually controlled during the computer-controlled processing of a workpiece without disturbing the contents of the memory device; and mode designating switch means for selecting one of the first, second, and third means.

* * * * *